United States Patent [19]

Sugiyama

[11] Patent Number: 5,754,024
[45] Date of Patent: May 19, 1998

[54] CONTROL DEVICE FOR SWITCHED RELUCTANCE MOTOR

[75] Inventor: Masanori Sugiyama, Kariya, Japan

[73] Assignee: Aisin Seiki Kabushiki Kaisha, Kariya, Japan

[21] Appl. No.: 772,576

[22] Filed: Dec. 26, 1996

[30] Foreign Application Priority Data

Dec. 26, 1995 [JP] Japan ................. 7-339581

[51] Int. Cl.[6] ............................... H02P 6/10
[52] U.S. Cl. .................. 318/701; 318/254; 318/702; 318/705
[58] Field of Search .................. 318/254, 685, 318/696, 701, 702, 705, 720–724

[56] References Cited

U.S. PATENT DOCUMENTS

| | | | |
|---|---|---|---|
| 4,707,650 | 11/1987 | Bose | 318/685 |
| 4,777,419 | 10/1988 | Obradovic | 318/696 |
| 5,440,218 | 8/1995 | Oldenkamp | 318/701 |

FOREIGN PATENT DOCUMENTS

| | | |
|---|---|---|
| 1298940 | 12/1989 | Japan. |
| 2231214 | 11/1990 | United Kingdom. |

*Primary Examiner*—Bentsu Ro
*Attorney, Agent, or Firm*—Sughrue, Mion, Zinn, Macpeak & Seas, PLLC

[57] ABSTRACT

A control device for a switched reluctance motor which includes a target current determination device for determining a target value of a current which is supplied to each of a plurality of coil phases of a motor, a current supply timing determination device for determining timings at which the current begins to be supplied to each of the coil phases and at which the supply of the current is ended, a pulse width modulating device for generating a pulse width modulating signal so that the current which is supplied to each of the coil phases is modulated so as to correspond to the target value and a synchronization device for synchronizing a starting time of the pulse width modulating signal with the timing at which the current begins to be supplied to each of the coil phases.

3 Claims, 7 Drawing Sheets

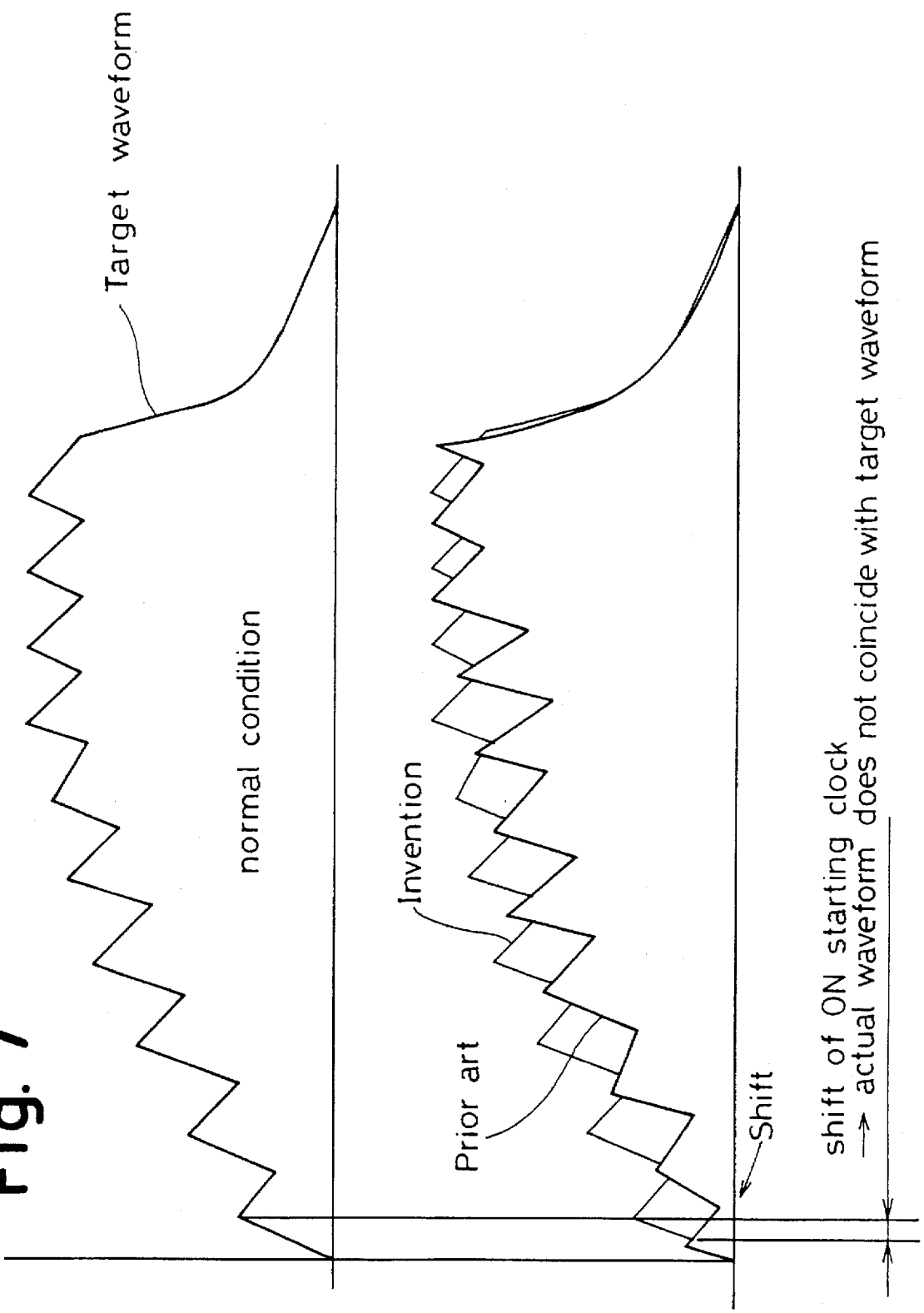

CONTROL DEVICE FOR SWITCHED RELUCTANCE MOTOR

BACKGROUND OF THE INVENTION

1. Field of the Invention

The present invention relates to a control device for a switched reluctance motor.

2. Description of the Prior Art

A conventional switched reluctance motor is disclosed in GB 2231214A and Japanese patent application laid-open publication No. 1 (1989)-298940. This switched reluctance motor includes a housing, a stator fixed to the housing and a rotor disposed in the stator. The rotor is fixed to an output shaft which is rotatably supported on the housing and thereby is rotatably disposed in the stator. The rotor has a plurality of pairs of rotor pole portions which project outwards in the diametrical direction and which extend in the axial direction. The stator has a plurality of pairs of opposing stator pole portions which project inwardly in the diametrical direction and which extend in the axial direction. Each of the stator pole portions is opposed to each of the rotor pole portions in response to the rotation of the rotor and a certain clearance is maintained between the stator pole portions and the rotor pole portions which are opposed to each other. On each of the stator pole portions, a coil is wound thereon. The coils which are wound on each pair of opposing stator pole portions are connected in series with each other and wherein a magnetic flux is generated between each pair of stator pole portions when current is supplied to the coils, which are wound thereon. A magnetic attracting force results between the rotor pole portions and the stator pole portions which are approaching each other. This magnetic attracting force is changed by controlling the supply current by means of switching elements in response to the rotational position of the rotor and thereby producing a rotary torque.

The current, which is supplied to the coil wound on one pair or several pairs of stator pole portions being approached by one pair or several pairs of rotor pole portions, is switched on and off as a pulse. In general, the current is switched on when a pair of rotor pole portions begins to be aligned with a pair of stator pole portions and the current is switched off before a pair of rotor pole portions is aligned with a pair of stator pole portions. Thus, the magnetic attracting force increases while the current is supplied and disappears in a moment when the current is switched off. On one hand, the rotary torque is obtained by this magnetic attracting force. On the other hand, a pair or several pairs of stator pole portions are attracted radially to a pair of rotor pole portions by this magnetic attracting force, respectively whereby the stator and the housing are strained. When the magnetic attracting force disappears, the strain on the stator is suddenly released and simultaneously, the housing is pressed outwards in the diametrical direction by the stator. This impulsive variation of the housing is generated periodically in response to the rotation of the rotor whereby vibration of the housing generates objectionable acoustic noise.

This objectionable acoustic noise can be reduced by the increase of the number of the rotor pole portions and the number of the stator pole portions. The reason for that is that the angle difference between the rotor pole portion and the stator pole portion becomes smaller and the strain on the stator due to the magnetic attracting force is reduced. In this case, however, the interval between adjacent stator pole portions shortens. Therefore, in the case where the current which is supplied to the coil wound on the stator pole portions is controlled by Pulse Width Modulation (PWM) control, the number of PWM pulses for generating the magnetic attracting force are decreased. In the conventional PWM control, there is a case in which a starting timing of the PWM pulse does not correspond to a timing at which the current begins to be supplied to the coil. If such case occurs at high speed, the number of PWM pulses for generating the magnetic attracting force are further decreased whereby the time during which the current is supplied to the coil shortens. As a result, it is not able to obtain the necessary rotary torque.

SUMMARY OF THE INVENTION

It is therefore an object of the present invention to provide an improved control device for switched reluctance motors which overcomes the above drawbacks.

It is another object of the present invention to provide an improved control device for a switched reluctance motor which can reduce the objectionable acoustic noise while ensuring the necessary rotary torque.

In order to achieve these objectives, there is provided an improved control device for a switched reluctance motor which includes target current determination means for determining a target value of a current which is supplied to each of the coil phases of a motor, current supply timing determination means for determining timings at which the current begins to be supplied to each of the coil phases and at which the supply of the current is ended, pulse width modulating means for generating a pulse width modulating signal so that the current which is supplied to each of the coil phases is modulated so as to correspond to the target value and synchronization means for synchronizing a starting timing of the pulse width modulating signal with the timing at which the current begins to be supplied to each of the coil phases.

BRIEF DESCRIPTION OF THE DRAWINGS

Additional objects and advantages of the present invention will become more apparent from the following detailed description of a preferred embodiment thereof when considered with reference to the attached drawings, in which

FIG. 7 shows current waveforms of each of the coil phases of the present invention and the prior art.

DETAILED DESCRIPTION OF THE INVENTION

A control device for a switched reluctance motor in accordance with a preferred embodiment of the present invention will be described with reference to the attached drawings.

Figure 1:
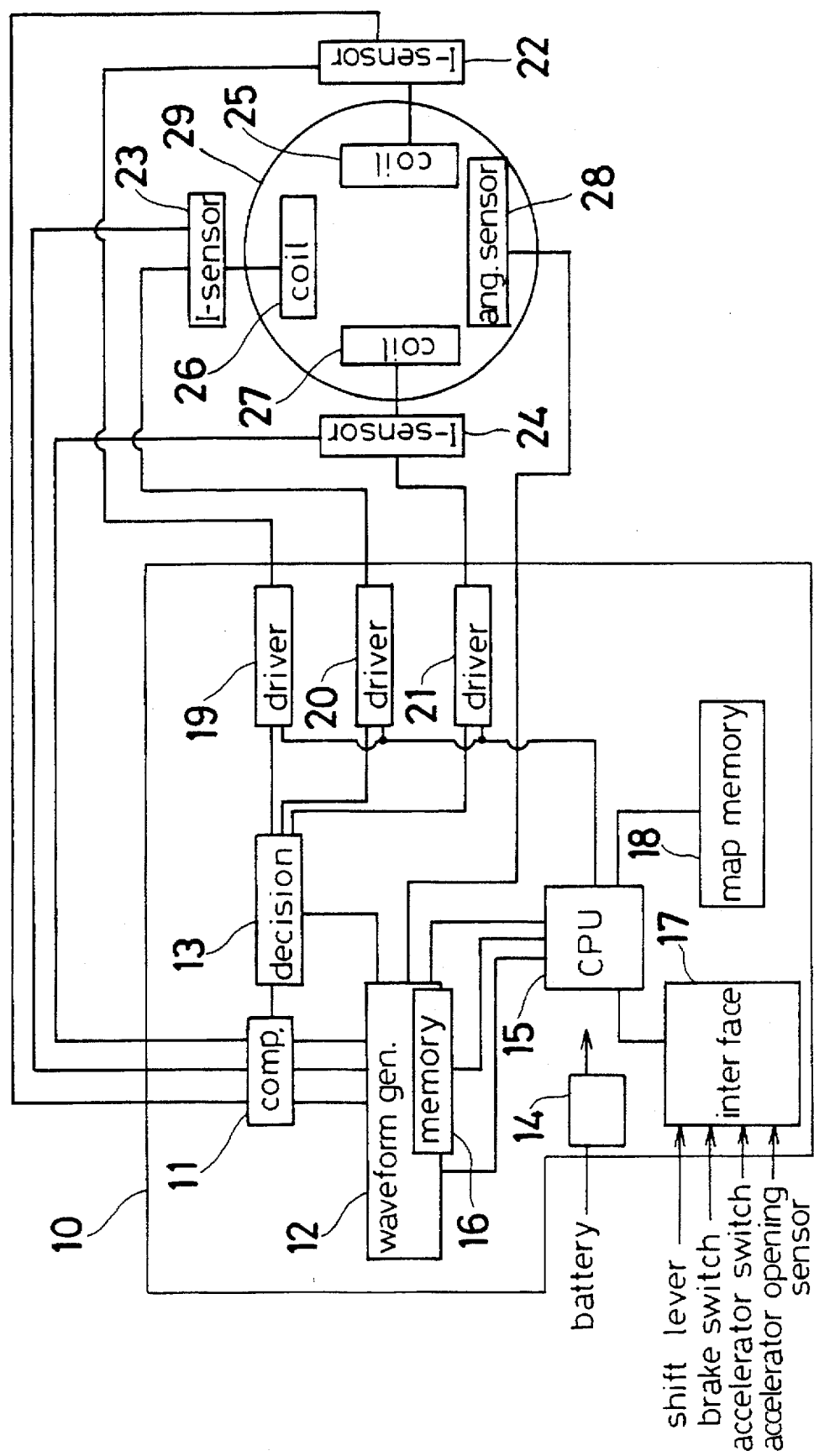
FIG. 1 shows a block diagram of an embodiment of the present invention.

FIG. 1 is a block diagram of an embodiment of the present invention which is applied to, for example, a driving unit for an electric vehicle. A single switched reluctance motor 29 is provided as the drive source and is controlled by a controller 10. The controller 10 controls the driving of the switched reluctance motor 29 on the basis of information which is fed from a shift lever (not shown), a brake switch (not shown), an accelerator switch (not shown) and an accelerator opening sensor (not shown). It will be seen that a storage battery is utilized as a power supply.

Figure 5:
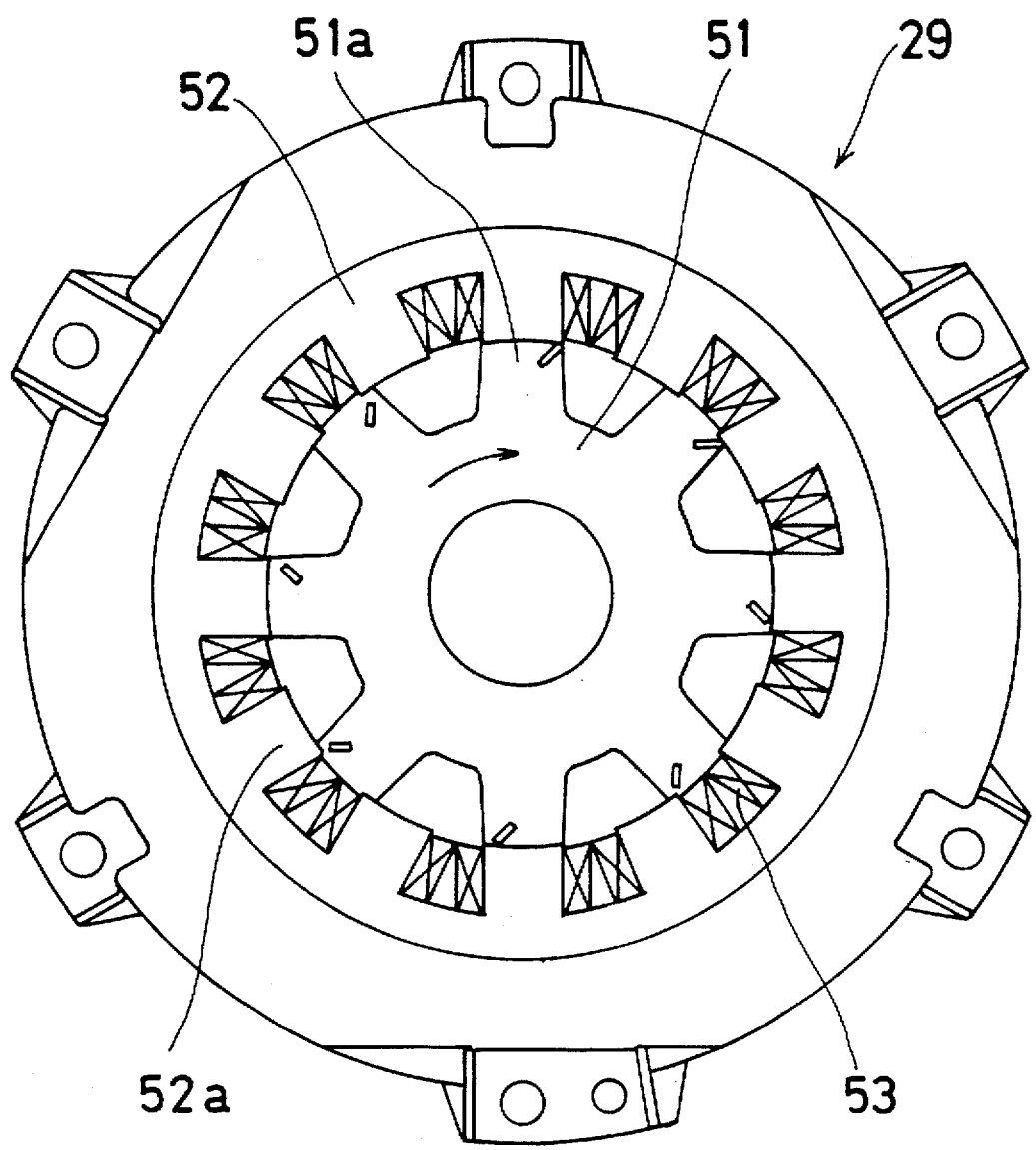
FIG. 5 shows an elevational view of a switched reluctance motor of an embodiment of the present invention.

As shown in FIG. 5, the switched reluctance motor includes a housing, a stator 52 fixed to the housing and a rotor 51 disposed in the stator 52. The rotor 51 is fixed to an output shaft which is rotatably supported on the housing and thereby is rotatably disposed in the stator 52. The rotor 51 has four pairs of rotor pole portions 51a which project outwards in the diametrical direction and which extend in the axial direction. The stator 52 has six pairs of opposing stator pole portions 52a which projection inwardly in the diametrical direction and which extend in the axial direction. Each of the stator pole portions 52a is opposed to each of the rotor pole portions 51a in response to the rotation of the rotor 51 and a certain clearance is maintained between the stator pole portions 52a and the rotor pole portions 51a which are opposed to each other. On each of the stator pole portions 52a, a coil 53 is wound thereon. The coils 53 which are wound on two pairs of opposing stator pole portions 52a are connected in series with each other to form a first phase coil 25, a second phase coil 26 and a third phase coil 27 (FIG. 1), each of which has four coils 53 connected in series.

When current is supplied to one of the first phase coil 25 to the third phase coil 27 a magnetic flux is generated between each pair of stator pole portions 52a. A magnetic attracting force results between the rotor pole portions 51a and the stator pole portions 52a which are approaching each other. This magnetic attracting force is controlled by changing over the supply of current to coil 25 to 27 in turn in response to the rotational position of the rotor 51 detected by an angle sensor 28 whereby rotary torque is produced.

The controller 10 is provided with a CPU (micro computer) 15, an input interface 17, a map memory 18, a power supply circuit 14, a current waveform generating circuit 12, a comparison circuit 11, a first phase coil driver 19, a second phase coil driver 20 and a third phase coil driver 21. The input interface 17 receives output signals of the shift lever (not shown), the brake switch (not shown), the accelerator switch (not shown) and the accelerator opening sensor (not shown) and supplies signals to the CPU 15. The CPU 15 formulates a target rotational speed and a target rotary torque for the switch reluctance motor 29 on the basis of information which is obtained from these signals and determines current waveform which should be supplied to each of the phase coils 25 to 27 in response to the result of the formulation. The CPU 15 reads the obtained current waveform from the map memory 18 and sets in a bi-directional memory 16 provided in the current waveform generating circuit 12.

Figure 3:
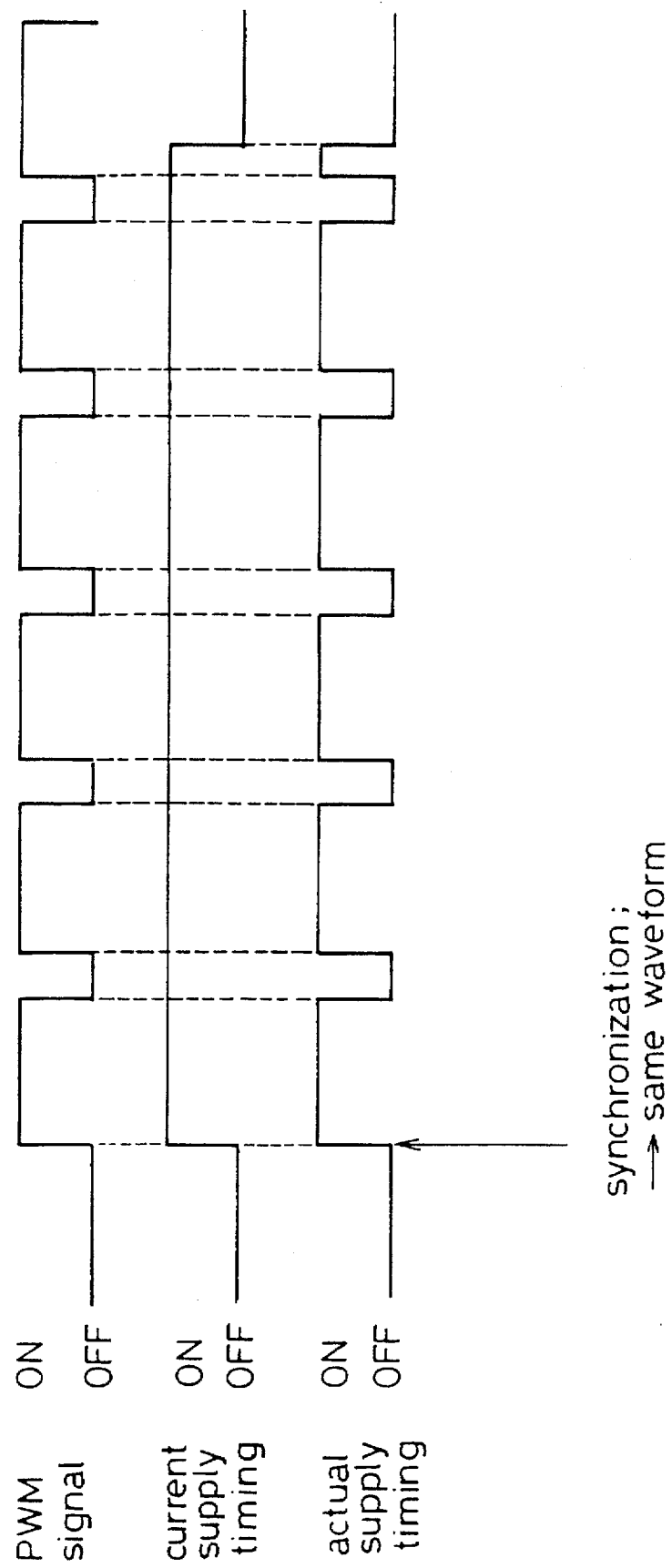
FIG. 3 shows timing charts of a PWM signal, current supply timing and actual current supply timing of an embodiment of the present invention.

As shown in FIG. 3, the supply of the current to each of the phase coils 25 to 27 is controlled by the current supply timing and a pulse width modulation (PWM) signal which modulates the amount of the supplied current. The current supply timing is written into the bidirectional memory 16 and is compared with the detected value (angle) of the angle sensor 28. When the detected value of the angle sensor 28 reaches the predetermined current supply timing, the supply of the current to each of the phase coils 25 to 27 is changed over. The comparison circuit 11 compares the current value written into the bidirectional memory 16 with an output value of each of the current sensors 22 to 24. The PWM signal is generated in the output decision circuit 13 so as to equalize the output value of each of the current sensors 22 to 24 with the written value and is fed to each of the drivers 19 to 21.

Figure 2:
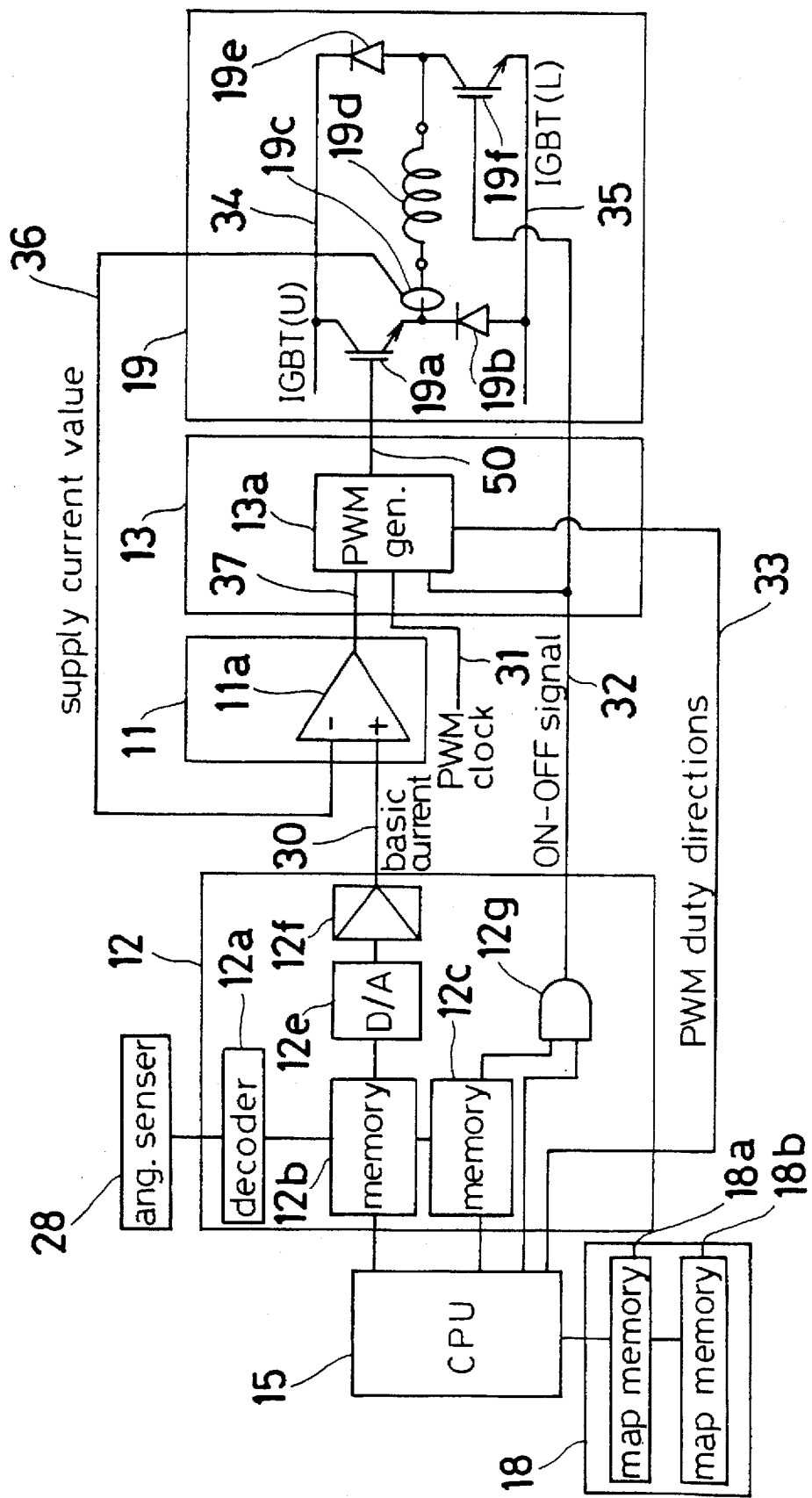
FIG. 2 shows a partial detailed block diagram of FIG. 1.

FIG. 2 shows a detailed block diagram of the first phase driver 19. The second phase driver 20 and the third phase driver 21 have the same construction as that of the first phase driver 19. The current waveform generating circuit 12 is provided with an address decoder 12a, two memories 12b and 12c, digital-analog converter 12e, output buffer 12f and AND circuit 12g. In the memory 12b, a target current value corresponding to a rotational angle of the rotor fed from the CPU 15 is written at an address corresponding to the rotational angle of the rotor. In the memory 12c, a current supply timing corresponding to the rotational angle of the rotor fed from the CPU 15 is written at an address correcting to the rotational angle of the rotor. The output signal of the angle sensor 28 is converted into an address value by the address decoder 12a and designates the reading address of the memories 12b and 12c. As a result, a target current value corresponding to the rotational angle of the switched reluctance motor 29 is read from the memory 12b on all such occasions and it is read from the memory 12c whether the current should be supplied to the phase coil or not. The value which is read from the memory 12 is outputted as ON-OFF signal 32 through the AND circuit 12g. A control signal from the CPU 15 is fed to the AND circuit 12g and therefore it is possible to make the ON-OFF signal 32 by OFF compulsory regardless of the value of the memory 12c.

A digital signal read from the memory 12b is converted into an analog signal by the digital-analog converter 12e and is fed to a non-inverting input terminal of a comparator 11a of the comparison circuit 11 as a basic current value 30 through the output buffer 12f. On the other hand, the current value which flows in coil 19d of the first phase driver 19 is detected by the current sensor 19c and is fed to an inverting input terminal of the comparator 11a as a supply current value 36. The comparator 11a compares the basic current value 30 and the supply current value 36 and feeds the comparison result to a PWM generating circuit 13a provided in the output comparison circuit 13 as a comparing current signal 37.

Figure 4:
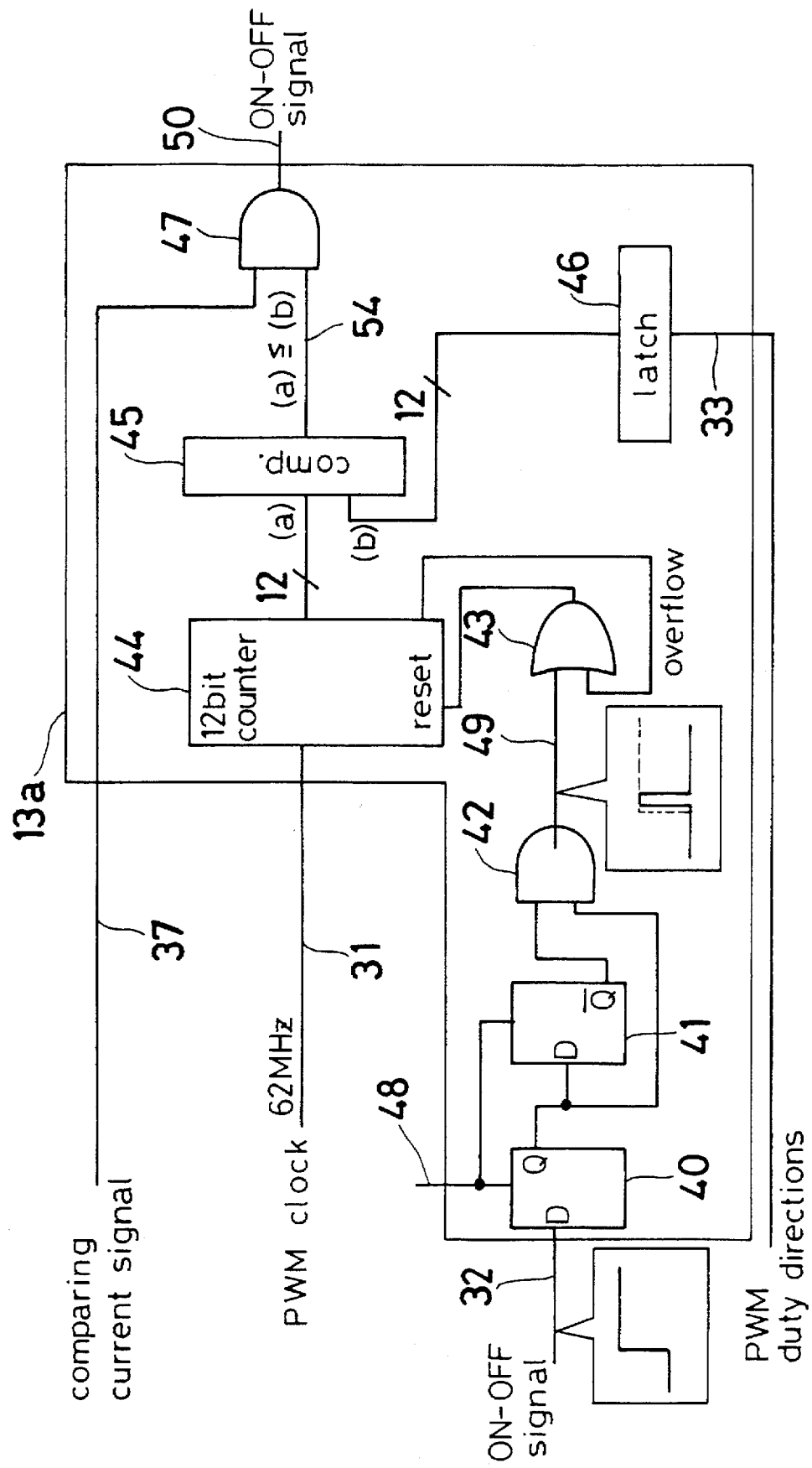
FIG. 4 shows a circuit diagram of an output decision circuit of an embodiment of the present invention.

FIG. 4 shows the PWM generating circuit 13a. The PWM generating circuit 13a is provided with two flip-flops 40 and 41, two AND circuits 42 and 47, an OR circuit 43, a 12 bit counter 44, a latch 46 and a comparison circuit 45. The flip-flops 40 and 41 are operated by a clock 48. The ON-OFF signal 32 is fed to a D terminal of the flip-flop 40 and the flip-flop 40 generates an output signal from a non-inverting output terminal in response to clock timing. The output signal from the inverting output terminal of the flip-flop 40 is fed to a D terminal of the flip-flop 41 and the flip-flop 41 generates an output signal from an inverting output terminal in response to the clock timing. The output signal from the non-inverting terminal of the flip-flop 40 and the output signal from the inverting terminal of the flip-flop 41 are fed to the AND circuit 42. Thus, the AND circuit 42 generates a trigger signal 49 which is a high level only for one clock, after the ON-OFF signal 32 is changed from OFF to ON.

This trigger signal 49 is fed to a reset terminal of the 12 bit counter 44 through the OR circuit 43. The 12 bit counter 44 counts the PWM clock of 62 MHz. An overflow output signal of the 12 bit counter 44 is fed to the OR circuit 43. The 12 bit counter 44 starts to count after the 12 bit counter 44 is reset when the ON-OFF signal 32 changes from OFF to ON and suspends the count at the overflow.

The latch 46 latches a PWM duty directions signal 33 as 12 bit signal. The comparison circuit 45 compares the PWM duty directions signal 33 latched in the latch 46 with the counted up output signal of the 12 bit counter 44. When the counted up output signal of the 12 bit counter 44 is smaller than the PWM duty directions signal 33, the comparison circuit 45 generates a high level signal. When the counted up output signal of the 12 bit counter 44 is not smaller than the PWM duty directions signal 33, the comparison circuit 45 generates a low level signal. Accordingly, the output of the comparison circuit 49 becomes a PWM duty signal 54 which the length of time being high level changes in response to the magnitude of the PWM duty directions signal 33.

The AND circuit 47 generates ON-OFF signal 50 in response to the AND condition between the comparing current signal 37 and the PWM duty signal 54. Accordingly, in FIG. 2, the ON-OFF signal 50 becomes OFF when the supply current value 36 is larger than the basic current value. When the supply current value 36 is smaller than the basic current value, the PWM duty signal corresponding to the magnitude of the PWM duty directions signal 33 is generated as the ON-OFF signal 50.

In FIG. 2, the ON-OFF signal 50 is fed to a base of the upper side transistor 19a of the first phase driver 19. A collector of the upper side transistor 19a is connected to a high voltage line 34 supplied from the power supply circuit 14. An emitter of the upper side transistor 19a is connected to one end of the coil 19d. The other end of the coil 19d is connected to a collector of the base of the lower side of the transistor 19f. An emitter of the lower side transistor 19f is connected to a lower voltage line 35 supplied from the power supply circuit 14. The ON-OFF signal 32 is fed to a base of the lower side transistor 19f. A diode 19b for a flywheel is interposed between the one end of the coil 19d and the lower voltage line 35. A diode 19e for the flywheel is interposed between the other end of the coil 19d and the high voltage line 34. The current value which flows in the coil 19d is detected by the current sensor 19c.

In the first phase driver 19, the current flows in the coil 19d only when the upper side transistor 19a and the lower side transistor 19f become ON at the same time. Namely, the upper side transistor 19a becomes ON when the ON-OFF signal 50 is ON. The lower side transistor 19f becomes ON when the ON-OFF signal 32 is ON. Accordingly, as shown in FIG. 3, actual current supply to the coil 19d is ON only when the current supply timing (the ON-OFF signal 32) and the PWM signal (the ON-OFF signal 50) are ON.

As mentioned above, the ON timing (starting timing of ON) of the PWM signal (the ON-OFF signal 50 synchronizes with the rise timing of the ON-OFF signal 32. Accordingly, at the timing when the current begins to be supplied, the actual supplied current waveform always becomes the same waveform and therefore, the actual starting timing for supplying the current is not changes.

Figure 6:
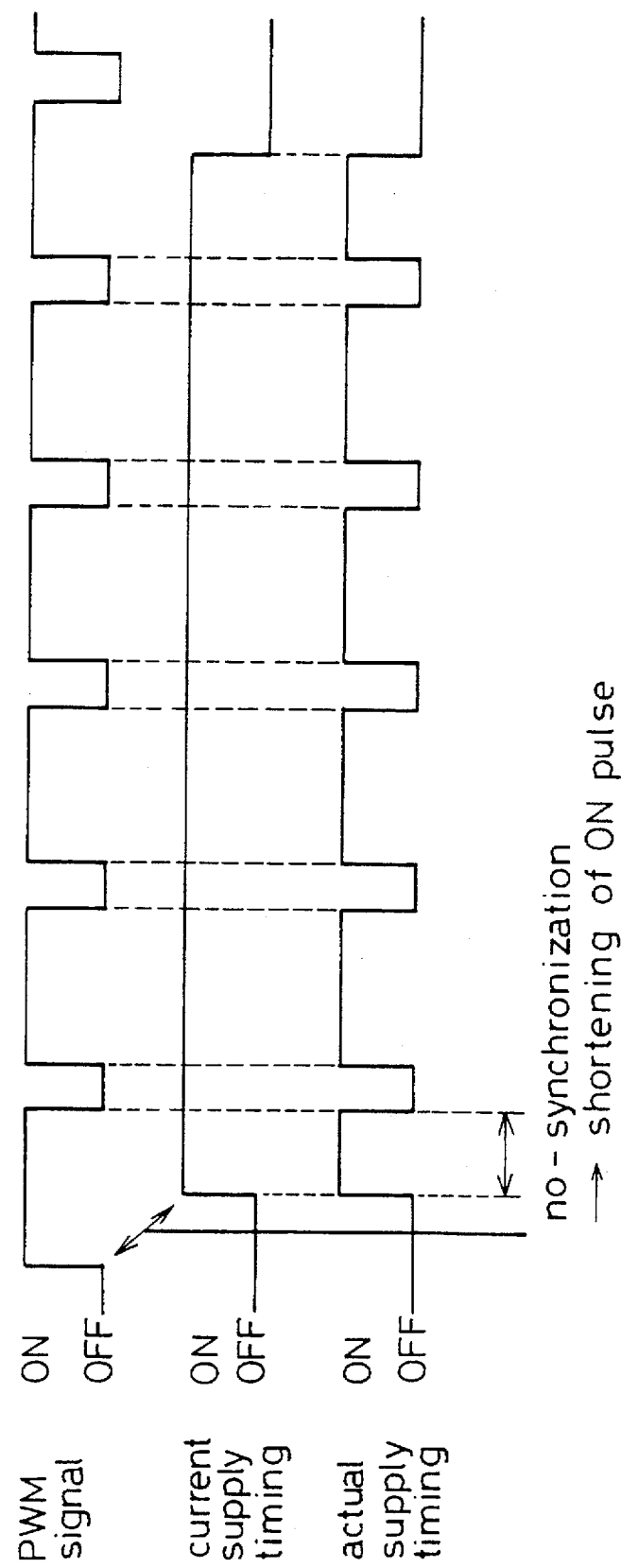
FIG. 6 shows timing charts of a PWM signal, current supply timing and actual current supply timing of the prior art.

In the prior control device, as shown in FIG. 6, there is a case in which the ON timing of the PWM signal is shifted relative to the ON timing of the current supply timing. In this case, the length of the first ON signal after start of ON timing of the current supply timing shortens. If such a poor condition of the ON timing occurs, as shown in FIG. 7, the rise of the actual current waveform delays relative to the target current waveform and thereby the rotary torque becomes lower than the desired rotary torque. In particular, when the switched reluctance motor is rotated at high speed, the interval of the ON of the current supply timing shortens and the number of pulses of PWM signal during the ON condition of the current supply timing is reduced. As a result, a ratio of decrease of the motoring torque becomes larger and the maximum rotational speed becomes lower. On the contrary, according to this embodiment, since the actual current waveform is coincided to the target current waveform, the desired rotary torque is obtained and the maximum rotational speed of the switched reluctance motor is not decreased.

The above mentioned phenomenon becomes notable when the number of the stator pole portions and the number of the rotor pole portions are increased. For example, if the number of stator pole portions is increased, the angle difference between adjacent stator pole portions becomes smaller and the shape of a space between the adjacent stator pole portions in which the coil is wound approaches a rectangular shape. Thus, it is possible to easily form or machine the stator, and the space between the adjacent stator pole portions becomes smaller and it is possible to wind the coil in the space while making good use of the space. Furthermore, the magnetic attracting force which operates on the stator pole portions when the current is supplied to the coil wound thereon is dispersed in the circumferential direction and therefore, the strain of the stator is reduced. Thus, the noise is reduced. Although there are many merits to increasing the number of stator pole portions and the rotor pole portions, the number of times which the current supply timing becomes ON increase per a rotation of the switched reluctance motor and therefore, the interval of the ON condition of the current supply timing shortens. In such a case, according to this embodiment, since the motoring torque and the maximum rotational speed of the switched reluctance motor is not decreased, it is possible to obtain the above mentioned merits while ensuring the necessary rotary torque and the necessary rotational speed.

Now, in this embodiment, until the CPU 15 renews the bi-directional memory 16, the control of the switched reluctance motor is performed by the high frequency on the basis of the current waveform written into the bi-directional memory 16. Therefore, since the processing speed of the CPU 15 is of no concern, it is possible to use a cheap CPU. When the duty ratio directed by the PWM duty directions signal 33 should be changed in response to the rotational angle, PWM duty memories which are the same as the memories 12b, 12c are added to the bi-directional memory 16. Thus, the CPU 15 reads the information from the map memory 18 and sets in the PWM duty memories. Then, the PWM duty directions signal 33 is read from the PWM duty memories.

As mentioned above, according to the present invention, since the PWM signal is started at the same time when the current supply timing becomes ON, even if the interval of the ON condition of the current supply timing shortens, it is possible to nearly coincide the actual current waveform with the target current waveform whereby it is possible to ensure the necessary rotary torque. Accordingly, it is possible to obtain plural merits (improvement of efficiency, reduction of cost, reduction of noise and so on) while ensuring the necessary rotary torque.

The principles, a preferred embodiment and modes of operation of the present invention have been described in the foregoing description. The invention, which is intended to be protected herein should not however be construed as limited to the particular forms disclosed, as these are to be regarded as illustrative rather than restrictive. Variations and changes may be made by those skilled in the art without departing from the spirit and scope of the invention. Accordingly, the foregoing detailed description should be considered exemplary in nature and not limited to the scope and spirit of the invention as set forth in the appended claim.

What is claimed is:

1. A control device for a switched reluctance motor comprising:

target current determination means for determining a target value of a current which is supplied to each coil phase of a motor, current supply timing determination means for determining timings at which the current begins to be supplied to each coil phase and at which the supply of the current is ended, pulse width modulating means for generating a pulse width modulating signal so that the current which is supplied to each coil phase is modulated so as to correspond to the target value; and synchronization means for synchronizing a starting timing of the pulse width modulating signal with the timing at which the current begins to be supplied to each coil phase.

2. A control device for a switched reluctance motor as recited in claim 1, wherein the target current determination means determines a target current waveform which should be supplied to each coil phase and the synchronization means makes an actual current waveform nearly coincide with the target current waveform.

3. A control device for a switched reluctance motor as recited in claim 2, wherein the current supply timing determination means generates an ON-OFF signal for determining the timings and the current is supplied to each coil phase when the ON-OFF signal in ON and the pulse width modulating signal is high level.

* * * * *